US012505828B2

(12) United States Patent
Yu et al.

(10) Patent No.: US 12,505,828 B2
(45) Date of Patent: Dec. 23, 2025

(54) SYSTEM AND METHOD TO NATURALLY JOIN HUMAN TALKING SOUNDS

(71) Applicant: HANGZHOU GAISHI TECHNOLOGY CO., LTD., Hangzhou (CN)

(72) Inventors: Fei Yu, Hangzhou (CN); Changyin Zhou, Hangzhou (CN)

(73) Assignee: HANGZHOU GAISHI TECHNOLOGY CO., LTD. (CN)

( * ) Notice: Subject to any disclaimer, the term of this patent is extended or adjusted under 35 U.S.C. 154(b) by 277 days.

(21) Appl. No.: 18/328,440

(22) Filed: Jun. 2, 2023

(65) Prior Publication Data

US 2024/0404512 A1  Dec. 5, 2024

(51) Int. Cl.
G10L 15/08 (2006.01)
G10L 15/05 (2013.01)
G10L 15/26 (2006.01)

(52) U.S. Cl.
CPC ............ *G10L 15/083* (2013.01); *G10L 15/05* (2013.01); *G10L 15/26* (2013.01); *G10L 2015/088* (2013.01)

(58) Field of Classification Search
CPC ....... G10L 15/083; G10L 15/05; G10L 15/28; G10L 25/30; G10L 2015/088; G10L 2015/085; G10L 21/0208; G10L 25/48; G10L 17/02; G10L 17/18; G10L 13/033; G10L 15/16; G10L 15/22
USPC ......................................................... 704/251
See application file for complete search history.

(56) References Cited

U.S. PATENT DOCUMENTS

| | | | | |
|---|---|---|---|---|
| 6,497,442 B1* | 12/2002 | Wacker | ..................... | B60P 3/14 |
| | | | | 296/24.32 |
| 2008/0062740 A1* | 3/2008 | Baek | .................. | G11C 13/0064 |
| | | | | 365/148 |
| 2008/0123746 A1* | 5/2008 | Ueda | ..................... | H04N 9/8042 |
| | | | | 375/E7.129 |
| 2009/0044253 A1* | 2/2009 | Interlandi | ............... | G06F 21/10 |
| | | | | 726/4 |
| 2015/0269953 A1* | 9/2015 | Siami | ...................... | G10L 21/02 |
| | | | | 704/201 |
| 2016/0004911 A1* | 1/2016 | Cheng | .................. | H04N 21/233 |
| | | | | 382/159 |

(Continued)

*Primary Examiner* — Vijay B Chawan
(74) *Attorney, Agent, or Firm* — McDonnell Boehnen Hulbert & Berghoff LLP

(57) ABSTRACT

The present disclosure describes systems and methods for naturally joining human talking sounds. An example method includes determining a first audio sequence and a second audio sequence from a full audio sequence based on a desired edit point. The method also includes determining a first separation point that defines a front portion of the first audio sequence and a back portion of the first audio sequence. The method yet further includes determining a second separation point that defines a front portion of the second audio sequence and a back portion of the second audio sequence, further defining an audio portion to be replaced. The method includes determining a regenerated audio portion, blending the regenerated audio portion with respective extensions of the front portion of the first audio sequence and the back portion of the second audio sequence, and replacing the audio portion to be replaced with the blended regenerated audio.

14 Claims, 10 Drawing Sheets

(56) References Cited

U.S. PATENT DOCUMENTS

| | | | | |
|---|---|---|---|---|
| 2016/0021334 | A1* | 1/2016 | Rossano | G10L 13/033 |
| | | | | 704/2 |
| 2018/0068662 | A1* | 3/2018 | Schlippe | G10L 25/90 |
| 2020/0341719 | A9* | 10/2020 | Zalon | G06F 3/16 |
| 2021/0098013 | A1* | 4/2021 | Day | H04L 65/764 |
| 2021/0192332 | A1* | 6/2021 | Gangotri | G10L 15/30 |
| 2021/0326421 | A1* | 10/2021 | Khoury | G10L 17/08 |
| 2022/0129236 | A1* | 4/2022 | Zalon | G06F 3/165 |
| 2022/0199102 | A1* | 6/2022 | Ostrand | H04L 65/1083 |
| 2023/0115674 | A1* | 4/2023 | Nighman | H04R 3/005 |
| | | | | 381/58 |
| 2023/0298593 | A1* | 9/2023 | Ramos | G10L 17/02 |
| | | | | 704/233 |
| 2023/0351807 | A1* | 11/2023 | Ren | G06V 20/40 |
| 2024/0321286 | A1* | 9/2024 | Cassidy | G10L 25/18 |
| 2024/0404512 | A1* | 12/2024 | Yu | G10L 15/083 |

* cited by examiner

SYSTEM AND METHOD TO NATURALLY JOIN HUMAN TALKING SOUNDS

BACKGROUND

Video media has become a major form of communication. Major media companies as well as individuals create and edit videos. Professional and conventional video editing tools provide advanced features for different effects. However, most video editing for individual users merely involves joining two video clips together or removing short video segments from a long video. In many situations, the video clips that are joined include people talking at the cutting point of the clips, which leaves obvious traces of talking sounds and sound discontinuities at the cutting point. In certain situations, it is important to join two audio clips naturally so that a listener cannot hear artifacts or traces of cutting and clipping.

In general, conventional methods to reduce artifacts or traces of cutting and clipping while joining two audio clips include methods such as applying zero-crossing tools with decay filters applied to blend two pieces of audio together. Other methods include using Pitch Synchronous Overlap and Add (PSOLA) tools to find a cutting point and blend with decay filters. However, these methods present several common problems. For example, these methods rely heavily on the accuracy of the cutting point being at the edge of two words. If the two pieces of audio are cut in the middle of a word, the conventional methods will not produce a natural sound output. Further issues arise when the speakers in the audio clips speak quickly, because it can be difficult to find a perfect cutting point between words that mix together. Conventional methods further present issues where the sounds of words change based on the surrounding context. For example, the "could" in "could you" sounds different from the "could" in "could we." Accordingly, the conventional methods fail to provide a natural join if the cutting point is affected by the context around it. Further, known methods do not account for consistent rhythms of human speech. Accordingly, improved systems and methods to naturally join audio clips are desirable.

SUMMARY

The present disclosure describes systems and methods for naturally joining human talking sounds.

In a first aspect, a system is described. The system includes a sub-sequence separator configured to determine a front portion of a first audio sequence and a back portion of a first audio sequence and determine a front portion of a second audio sequence and a back portion of a second audio sequence. The system yet further includes a gap mask predictor configured to determine a gap duration between the back portion of the first audio sequence and the front portion of the second audio sequence and determine a mask with a duration based on the gap duration. The system also includes an audio-mask feature extraction module configured to concatenate the back portion of the first audio sequence, the mask, and the front portion of the second audio sequence, generating a concatenated audio representation. The system further includes an audio representation recovery module configured to reconstruct an audio representation of the mask from the concatenated audio representation, forming a recovered audio representation. The audio representation recovery module is also configured to overwrite the concatenated audio representation with the recovered audio representation. The system further yet includes an audio vocoder configured to determine an audio signal from the recovered audio representation and output a generated audio sequence. The system also includes an audio join module configured to determine a final audio output, by concatenating the front portion of the first normalized audio sequence, the generated audio sequence, and the back portion of the second normalized audio sequence.

In a second aspect, a method is described. The method includes determining a front portion of a first audio sequence and a back portion of the first audio sequence. The method also includes determining a front portion of a second audio sequence and a back portion of the second audio sequence. The method also includes determining a gap duration between the back portion of the first audio sequence and the front portion of the second audio sequence. The method additionally includes generating a mask with a duration based on the gap duration. The method further yet includes concatenating the mask with the back portion of the first audio sequence and the front portion of the second audio sequence, generating a concatenated audio representation. The method includes recovering an audio representation of the mask from the concatenated audio representation, forming a recovered audio representation. The method additionally includes reconstructing an audio signal from the recovered audio representation. The method also includes determining a final audio output by concatenating the front portion of the first audio sequence, the reconstructed audio representation, and the back portion of the second audio sequence.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limited. Aspects of the present disclosure, as generally described herein, and illustrated in the figures, can be arranged, substituted, combined, separated, and designed in a wide variety of different configures, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In the present disclosure, systems and methods for naturally joining audio clips. Specifically, some embodiments could relate to naturally joining audio clips of human talking sounds so that when a listener hears the newly joined sound, they cannot tell if the clips were originally recorded as one continuous clip. The systems and method include normalizing the loudness of the audio clips, separating the clips to cut each input into a front portion and a back portion, predicting the gap length between the corresponding back sequence and front sequence, making use of a neural network model to predict full audio representation with the gap mask, recovering audio from the representation, and concatenating the corresponding front portion, recovered audio, and back portion into a final, seamlessly-joined output.

II. Example Systems

Figure 1:
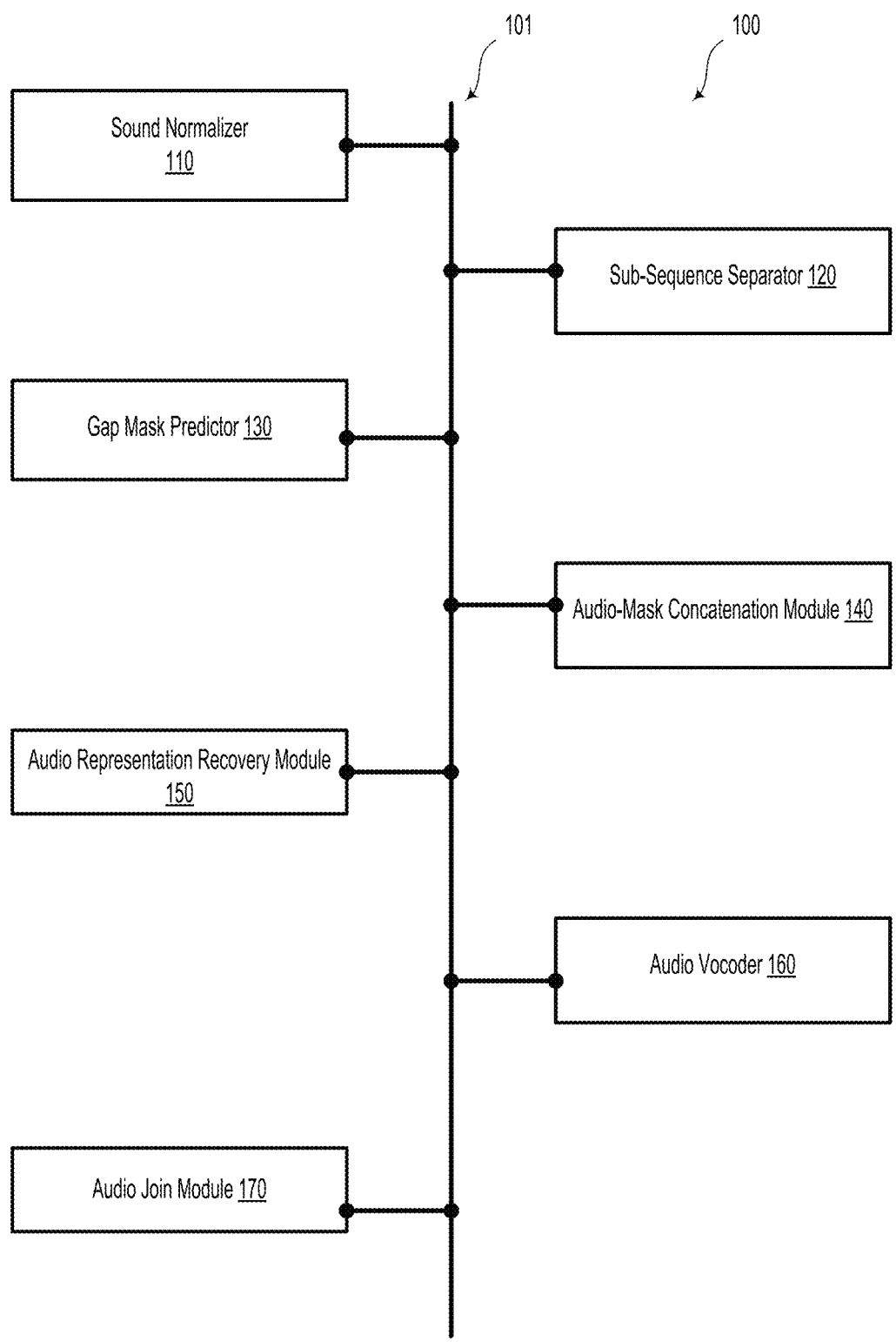
FIG. 1 illustrates a system, according to an example embodiment.

FIG. 1 illustrates a schematic block diagram of a system 100, according to an example embodiment. System 100 includes a communication interface 101. The communication interface 101 may provide connectivity between various elements of system 100 by way of various wired (e.g., coaxial cable, optical fiber, Ethernet, etc.) or wireless (e.g., infrared, Wi-Fi, Cellular, low-power wide-area networks (LPWAN), Bluetooth, Bluetooth Low Energy (BLE), etc.) protocols. The components of system 100 may be coupled to the communication interface 101.

The system 100 includes an optional sound normalizer 110. The sound normalizer 110 could include a peak normalizer, a loudness normalizer, or any other type of sound normalizer. In some embodiments, the sound normalizer 110 could be configured to receive audio inputs, such as audio sequences cut from a longer video clip in which there are human voices talking in each audio sequence such that there are talking sounds near and/or at the cutting point of both audio sequences. The sound normalizer 110 could be configured to output normalized audio sequences. It will be understood that other any normalizing technique is possible and contemplated. Additionally, it will be understood that some embodiments described herein need not include the sound normalizer 110 or the process of sound normalization.

The system 100 also includes a sub-sequence separator 120. The sub-sequence separator 120 could be configured to accept as inputs audio sequences. In some embodiments, the sub-sequence separator 120 could be configured to accept as inputs audio sequences including normalized audio sequences, such as those output by the sound normalizer 110. The sub-sequence separator 120 could further be configured to determine a front portion and a back portion of an audio sequence.

In example embodiments, the sub-sequence separator 120 could be utilized in various methods to find relevant separation points within a given audio sequence having a join point associated with a discontinuity. For instance, in a first example embodiment, a denoising process could be initially applied to the audio sequence. Thereafter, the sub-sequence separator 120 could be operable to find silence intervals which may be characterized by: 1) a root-mean-square energy $<=0.03$; and 2) an interval duration $>=100$ ms. It will be understood that other threshold RMS energy values and/or threshold interval duration values are possible and contemplated.

Once a silence interval is determined, a center time of each silence interval is identified as a candidate separation point.

After identifying the candidate separation points, a first separation point may be selected as the candidate separation point that occurs immediately prior to the join point. Furthermore, a second separation point may be selected as the candidate separation point that occurs immediately after the join point.

In another embodiment, the sub-sequence separator 120 could be utilized in a different method. In such scenarios, automatic speech recognition (ASR) could be used to obtain a transcript from the audio sequence. A text-audio alignment could be performed to quantify a plurality of word durations of individual words of the transcript and/or gap intervals between the individual words.

Further, gap intervals greater than 100 milliseconds may be determined. A center point of each such gap interval could be identified or otherwise labeled as a candidate separation point. It will be understood that other gap intervals and/or related duration thresholds are possible and contemplated.

Similar to the earlier method, a first separation point could be identified as the candidate separation point that occurs immediately before the join point. Furthermore, a second separation point may be identified as the candidate separation point that occurs immediately after the join point.

In various embodiments, the sub-sequence separator 120 could include a noise reduction module configured to reduce signal noise, such as in the first normalized audio sequence 112 and the second normalized audio sequence 114.

The system 100 yet further includes a gap mask predictor 130. The gap mask predictor 130 could be configured to receive as inputs two audio sequences. In some embodiments, the inputs to the gap mask predictor 130 could be portions of audio sequences determined by the sub-sequence separator 120. The gap mask predictor 130 could also be configured to determine a gap duration between the inputs and then determine a mask with a duration based on the gap duration.

In various embodiments, the gap mask predictor 130 could be configured to use a transformer based feature extractor connected with a multilayer perceptron (MLP) layer. In some embodiments, the feature extractor could be trained using a self-supervised learning method.

Various methods to train the gap mask predictor 130 are contemplated. In an example embodiment, ASR could be utilized to obtain a transcript from the audio sequence. In such a scenario, a text-audio alignment could be performed to identify, for each word in the audio sequence, a word duration and/or, for every nearest neighbor pair of words, identify a gap interval between the two words.

Furthermore, the training method may include identifying all consecutive words that are connected in time. For such groups of connected words, the method may randomly choose a pair of words and delete a portion of the audio signal of duration 0-200 milliseconds that is centered at the time where those two words are connected. In some embodiments, the duration of the deleted portion might not equally distributed between 0-200 milliseconds. For example, deleted portions with duration between 30-80 milliseconds could be weighted so as to occur more often, which may more realistically reflect what happens in normal speech. Output of this step may include a front audio sequence, back audio sequence, and the duration of the deleted audio portion between the front and back audio sequences.

Yet further in the proposed training method, an artificial intelligence model may be trained based on a plurality of front and back audio sequences from the prior method step. In such a scenario, the front and back audio sequences may be modified based on the variable duration of the deleted portion from the prior method step. It will be understood that other ways to train the artificial intelligence model associated with the gap mask predictor 130 are possible and contemplated.

The system 100 also includes an audio-mask feature extraction module 140. The audio-mask feature extraction module 140 could be configured to receive as inputs various sequences of audio and a mask, such as the mask determined by the gap mask predictor 130. The audio-mask feature extraction module 140 could be configured to concatenate the sequences of audio and mask to generate a concatenated audio representation.

The system 100 further includes an audio representation recovery module 150. The audio representation recovery module 150 could be configured to receive as an input an audio representation including a mask. In some embodiments, such an input could include a concatenated audio representation generated by the audio-mask feature extraction module 140. The audio representation recovery module 150 could be further configured to reconstruct an audio representation of the mask from the received audio representation, forming a recovered audio representation.

The audio representation recovery module 150 could be configured to completely replace selected original audio portions with the recovered audio representation. For example, in some embodiments, the original back portion of first audio sequence, and the original front portion of second audio sequence could be removed during the recovery process.

The system 100 further yet includes an audio vocoder 160. The audio vocoder 160 could be configured to receive as an input an audio representation. In some embodiments, such an audio representation could include a recovered audio representation 152 formed by the audio representation recovery module 150. The audio vocoder 160 could further be configured to determine an audio signal form the recovered audio representation, generating an audio sequence that includes the recovered audio representation.

The system 100 additionally includes an audio-join module 170. The audio-join module 170 could be configured to receive as inputs a plurality of audio sequences and concatenate the audio sequences to determine a final audio output. In some embodiments, such inputs could include sequences determined by at least one of the components of system 100.

Figure 2:
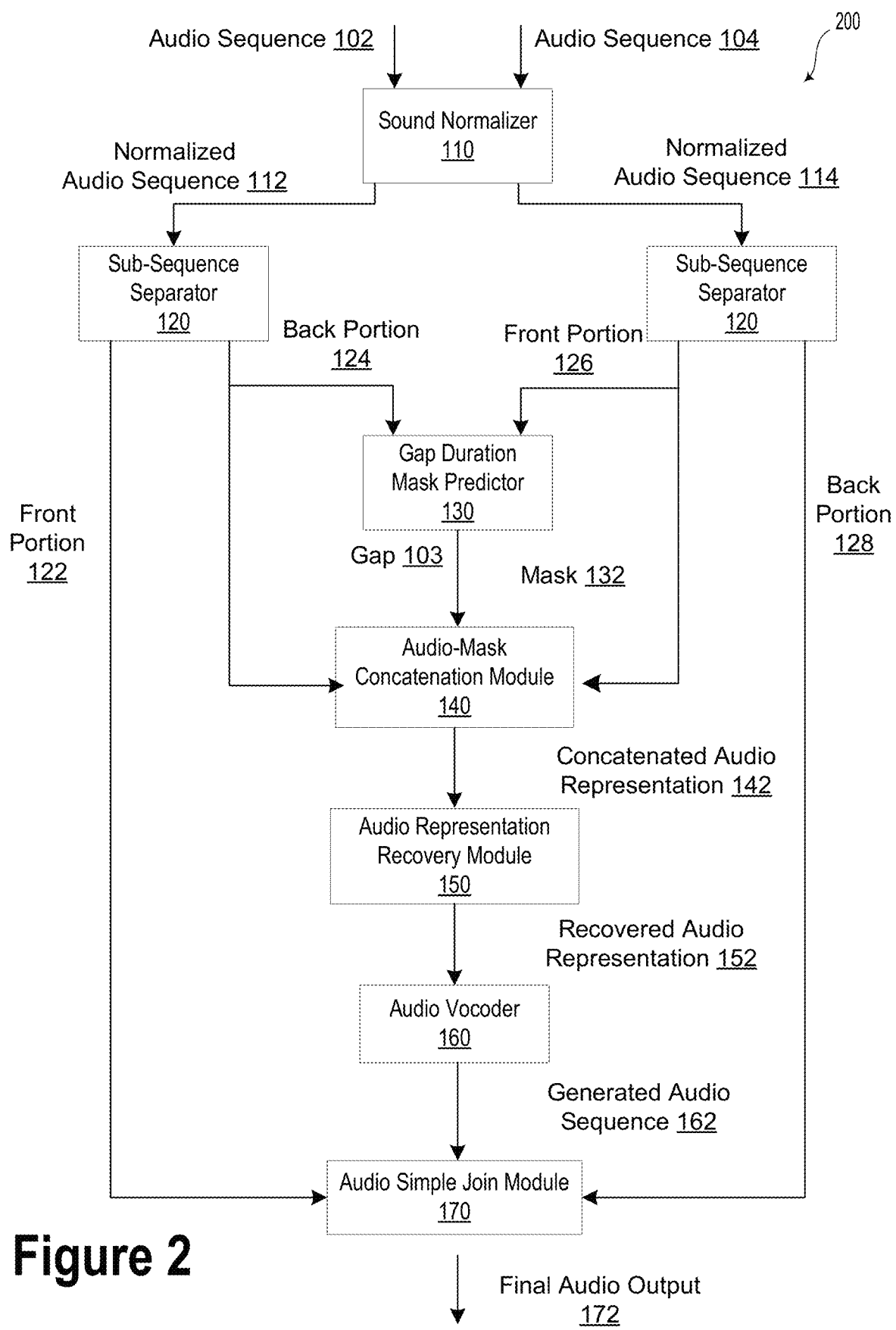
FIG. 2 illustrates an audio join scenario, according to an example embodiment.

FIG. 2 illustrates a scenario 200 of system 100 according to an example embodiment. In some embodiments, the sound normalizer 110 could be configured to accept as inputs a first audio sequence 102 and a second audio sequence 104. The sound normalizer 110 could be configured to apply a constant amount of gain to at least one of the first audio sequence 102 or the second audio sequence 104 based on their respective frequency peaks and/or volume, outputting a first normalized audio sequence 112 and a second normalized audio sequence 114. The sound normalizer 110 could be further configured to perform sample rate adjustments on the first audio sequence 102 and the second audio sequence 104.

In the illustrated scenario 200, the system 100 also includes a sub-sequence separator 120. The sub-sequence separator 120 could be configured to accept as inputs the first normalized audio sequence 112 and the second normalized audio sequence 114. The sub-sequence separator 120 could then cut the first normalized audio sequence 112 into a front portion 122 of the first normalized audio sequence 112 and a back portion 124 of the first normalized audio sequence 112 and the second normalized audio sequence 114 into a front portion 126 of the second normalized audio sequence 114 and a back portion 128 of the second normalized audio sequence 114.

Because an objective of the system 100 is to naturally join two audio sequences that are taken from different points of a video, there is a gap 103 between the first audio sequence 102 and the second audio sequence 104. The gap mask predictor 130 could be configured to accept as inputs the back portion 124 of the first normalized audio sequence 112 and the front portion 126 of the second normalized audio sequence 114 and determine the gap 103 from analysis of the back portion 124 of the first normalized audio sequence 112 and the front portion 126 of the second normalized audio sequence 114. The gap mask predictor 130 could be further configured to create a mask 132 with a duration based on the gap 103. In some embodiments, the mask 132 could have a duration equal to the duration of the gap 103, but in other embodiments, the mask 132 could have a different duration than the duration of the gap 103.

In some embodiments, the gap mask predictor 130 could be configured to output a mask with a set duration, for example 20 milliseconds. It will be understood that other durations are possible and contemplated. As an example, the set duration could be between 0.1 milliseconds to 100 milliseconds or longer. In other embodiments, the gap mask predictor 130 could be configured to use a transformer based feature extractor connected with a multilayer perceptron (MLP) layer, the feature extractor including a self-supervised learning method In some embodiments, the gap mask predictor 130 could be configured to classify one or more phonemes using classic audio processing method or neural network, then lookup for the duration of this heuristic phoneme duration. The gap mask predictor 130 may also compensate for the time difference between various heuristic phoneme durations and currently detected phoneme duration and sum up those time differences as a potential output duration.

In various embodiments, the mask 132 could be any kind of audio representation, such as a mel spectrogram or a mel frequency cepstral coefficient (MFCC) feature. As an example, a mask including a mel spectrogram could have a duration of 60 milliseconds and could be a corresponding feature vector of zeros.

The system 100 additionally includes an audio-mask feature extraction module 140. As illustrated in FIG. 2, the audio-mask feature extraction module 140 could be configured to accept as inputs: 1) the back portion 124 of the first normalized audio sequence 112; 2) the mask 132; and 3) the front portion 126 of the second normalized audio sequence 114. The audio-mask feature extraction module 140 is configured to join the back portion 124 of the first normalized audio sequence 112, the mask 132, and the front portion 126 of the second normalized audio sequence 114.

The audio-mask feature extraction module 140 could be configured to pad the mask 132 by adding padding 131 before the mask 132 and padding 133 after the mask 132, creating a padded mask 134. In some embodiments, the padding 133 could include zero-padding. In other embodiments, the padding 131 and the padding 133 could include various types of padding known in the art.

Figure 4A:
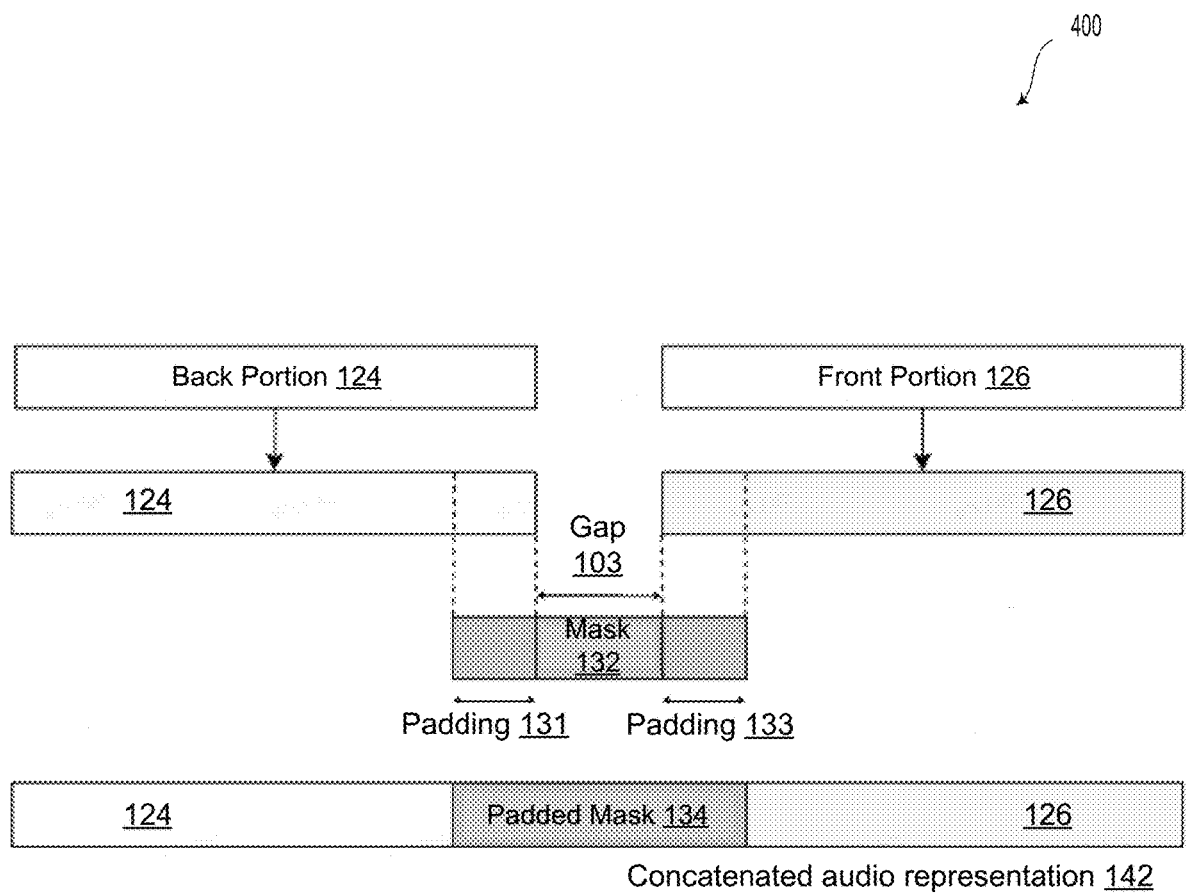
FIG. 4A illustrates a concatenation of audio segments, according to an example embodiment.

As illustrated in FIG. 4A, the padded mask 134 could overlap and overwrite a corresponding segment of the back portion 124 of the first normalized audio sequence 112 and a corresponding segment of the front portion 126 of the second normalized audio sequence 114. The audio-mask feature extraction module 140 could then further be configured to create and output a concatenated audio representation 142, formed from the back portion 124 of the first normalized audio sequence 112, the padded mask 134, and the front portion 126 of the second normalized audio sequence 114. The padded mask could include an audio representation such as: 1) frequency-based information, including MFCC features or mel spectrogram; 2) time-based information, including raw waveform data or time-domain processing derived information, such as that applied by certain filters like denoise, high-pass, low-pass, band-pass, shelf filters, or any combination of such filters etc.; or 3) other kinds of hidden and complex representations learned from neural network models, such as a variational autoencoder (VAE).

The system 100 further includes an audio representation recovery module 150. The audio representation recovery module 150 is configured to reconstruct an audio representation that is hidden by the mask 132. The audio representation recovery module 150 could be configured to utilize a neural network model to generate a recovered audio representation 152 to fit into the mask 132. In some embodiments, the audio representation recovery module 150 could include a transformer-based machine learning technique such as Audio Bidirectional Encoder Representations from Transformers (Audio BERT).

In some embodiments, the audio representation recovery module 150 could be configured to accept as an input: 1) the mask 132 including a mel spectrogram audio representation or 2) an MFCC representation, and utilize a self-supervised learning technique to determine the recovered audio representation 152 for the mask 132. In other embodiments, the audio representation recovery module 150 could be configured to receive as an input the mask 132 including a mel spectrogram audio representation and utilize an image imprinting technology to interpret the mask 132 as an image and fill in the missing parts to form the recovered audio representation 152.

In various example embodiments, the audio representation recovery module 150 could utilize a trained artificial intelligence model. The training method for such an AI model may include utilizing ASR to obtain a transcript from the audio sequence. Subsequently, a text-audio alignment process may be performed to obtain time intervals for the duration of each word and/or obtain gap durations between each pair of nearest-neighbor words.

In such a training method, a second step could include identifying a group of consecutive words that are connected in time. Thereafter, from the connected word group, a pair of temporally-adjacent words may be randomly selected. From the selected word pair, an audio portion of duration 0-200 milliseconds is deleted. The deleted audio portion may be centered at the time where the two words are connected. When randomly choosing the gap deletion duration from 0 to 200 milliseconds, the range of 30-80 milliseconds may be more heavily weighted so as to occur more frequently-which is what happens more frequently in reality. In an example embodiment, an output of this step may include a front audio sequence, back audio sequence, and the duration of deleted portion.

A third step in the training method may include converting the audio sequence from the prior method step into one of several possible types of audio representation, as described elsewhere herein. In other words, the audio sequence (with deleted portion) may be converted into a front audio representation and a back audio representation.

The training method may further include training the AI model based on inputs including the front and back audio representations from the third step, and the duration of deleted portion (which corresponds to the gap mask duration) from the second step. The output of the AI model include a full audio representation with front audio representation, gap mask, and back audio representation concatenated together.

The system 100 additionally includes an audio vocoder 160. The audio vocoder is configured to accept as an input the recovered audio representation 152 and reconstruct an audio wave of the recovered audio representation, forming a generated audio sequence 162.

In some example embodiments, the audio vocoder 160 could utilize an artificially intelligent vocoder such as HIFI-GAN or MelGAN. In such embodiments, the audio vocoder 160 could be configured to general real, natural speech.

In further embodiments, the audio vocoder 160 could utilize another algorithm such as the Griffin-Lim algorithm (GLA). It will be understood that the audio vocoder 160 could utilize other speech recognition and/or speech recovery algorithms.

As illustrated in FIG. 2, the audio-join module 170 could be configured to accept as inputs: 1) the front portion 122 of the first normalized audio sequence 112, 2) the generated audio sequence 162, and 3) the back portion 128 of the second normalized audio sequence 114. The audio-join module 170 is further configured to concatenate the front portion 122 of the first normalized audio sequence 112, the generated audio sequence 162, and the back portion 128 of the second normalized audio sequence 114.

Figure 6A:
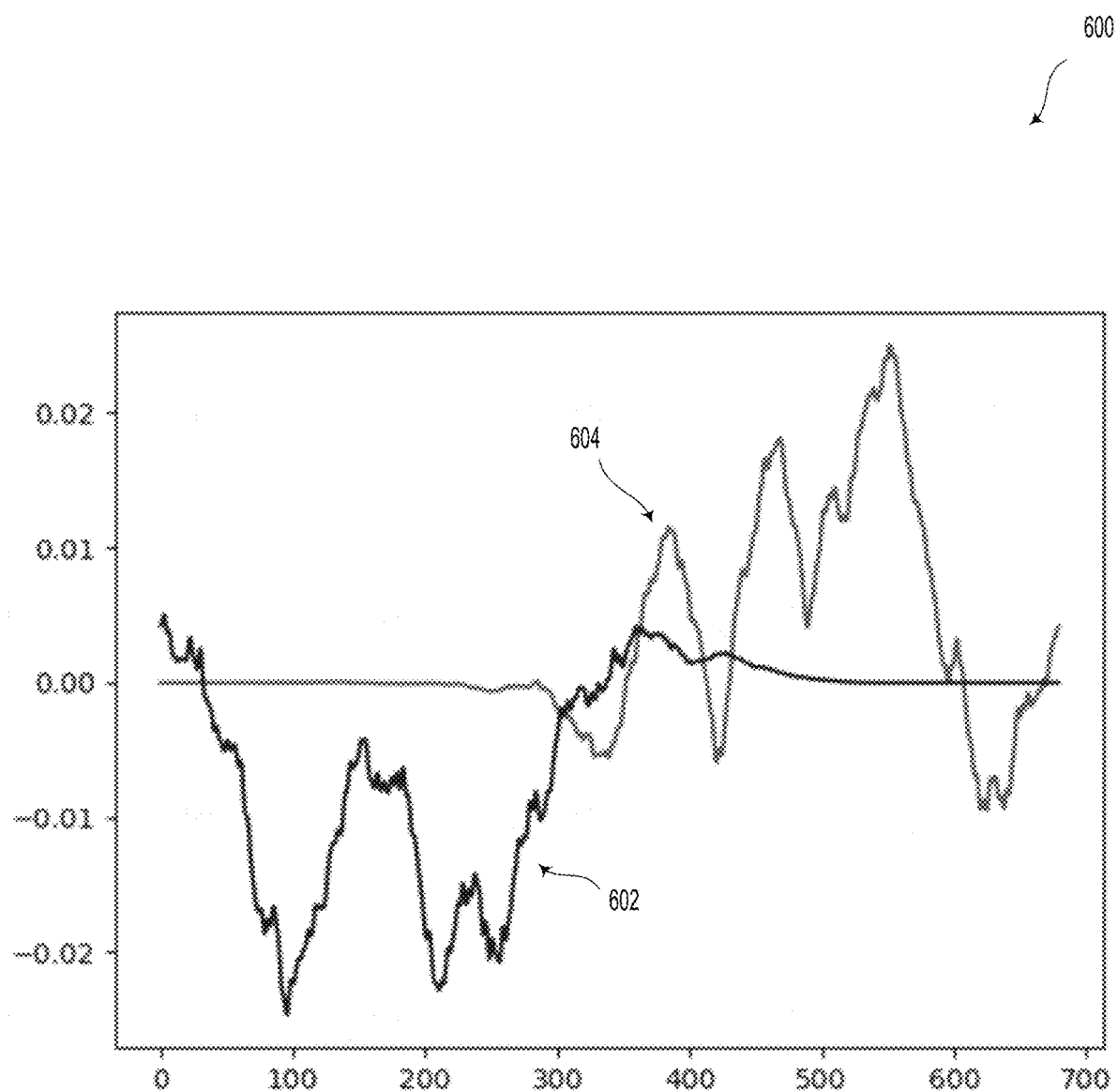
FIG. 6A illustrates a representation of two pieces of audio before an audio join scenario, according to an example embodiment.
Figure 6B:
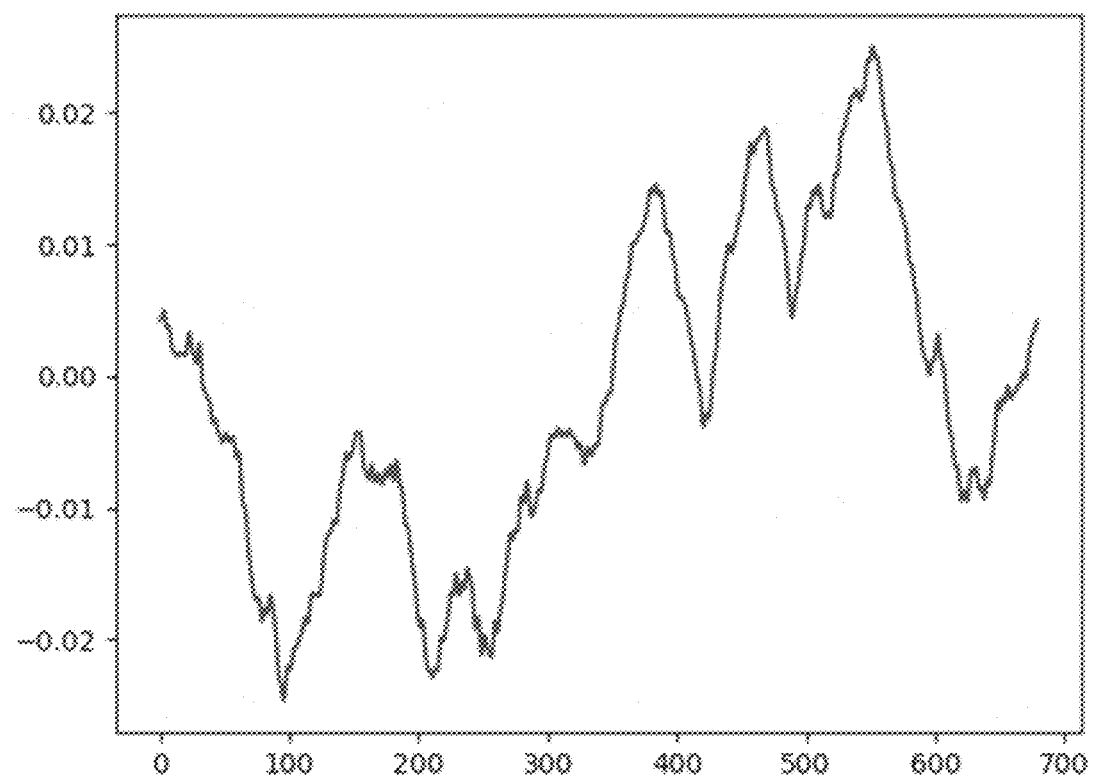
FIG. 6B illustrates a representation of joined pieces of audio after an audio join scenario, according to an example embodiment.

In some embodiments, the audio-join module 170 could be configured to utilize a zero-crossing join technique to determine the final audio output 172. In such embodiments, the audio-join module 170 is configured to overlap the front portion 122 of the first normalized audio sequence 112 with the generated audio sequence 162 and overlap the generated audio sequence with the back portion 128 of the second normalized audio sequence 114, as illustrated in FIGS. 6A and 6B.

Figure 3:
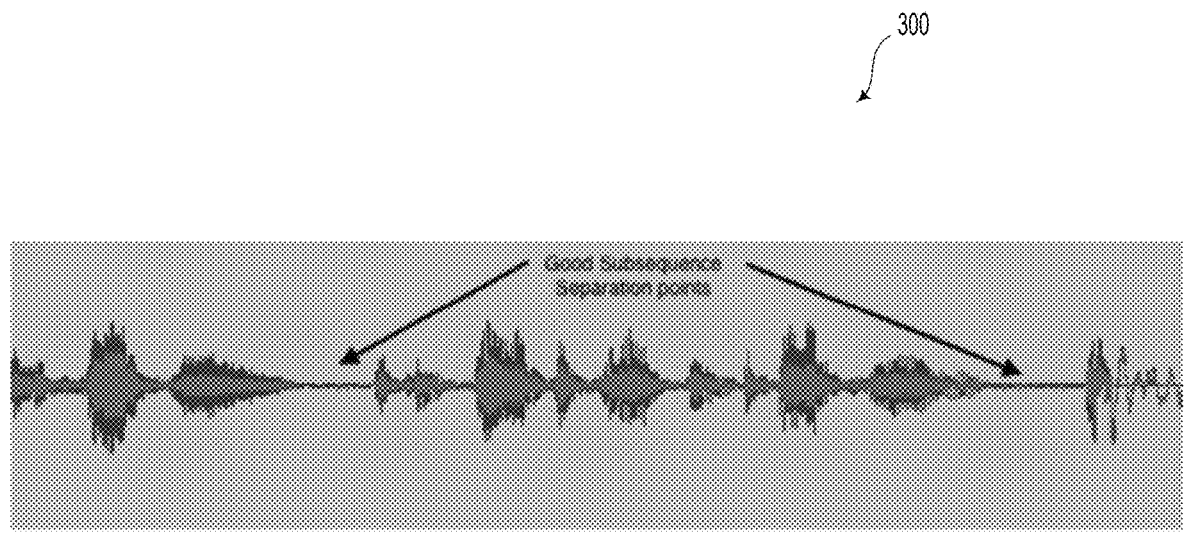
FIG. 3 illustrates a sub-sequence separation scenario, according to an example embodiment.

FIG. 3 illustrates a sub-sequence separation scenario 300, according to an example embodiment. Sub-sequence separation scenario 300 represents a system and method to make future joining of audio sequence easier by determining a point where the sound volume of an audio sequence is low, such as points where the speakers have paused talking.

FIG. 4A illustrates a concatenation of audio segments 400, according to an example embodiment of an audio-mask feature extraction module. As illustrated, the audio-mask feature extraction module could be configured to pad a mask determined to fit a gap duration between two audio representations. As illustrated in FIG. 4A, the padded mask 134 could overlap and overwrite a corresponding segment of the two audio representations.

Figure 4B:
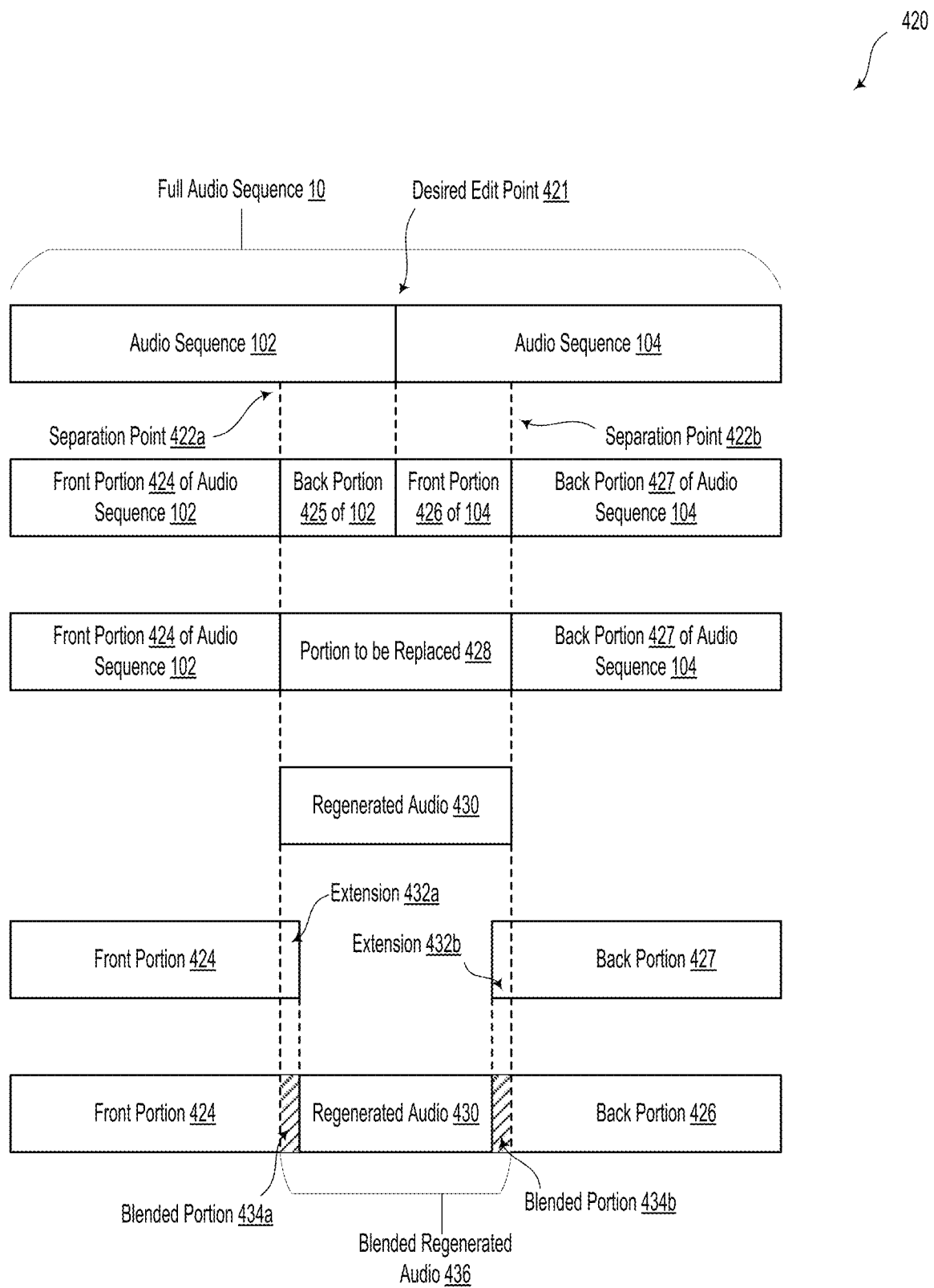
FIG. 4B illustrates an audio join scenario, according to an example embodiment.

FIG. 4B illustrates an audio join scenario 420, according to an example embodiment. Audio join scenario 420 illustrates how an audio sequence may be automatically spliced and blended to remove an audio discontinuity, a speaking error, or another undesirable audio feature.

The audio join scenario 420 could be carried out by a system that may include similar elements as that of system 100. As an example, audio join scenario 420 could be carried out, in part, by a sub-sequence separator (e.g. sub-sequence separator 120) that may be configured to identify a first audio sequence 102 and a second audio sequence 104 from a full audio sequence 10, which may be defined by a desired edit point 421. As described elsewhere, the desired edit point 421 could include an error in script-reading, an audio discontinuity, or another type of undesired audio feature.

The sub-sequence separator could additionally determine a first separation point 422a that defines a front portion 424 of the first audio sequence 102 and a back portion 425 of the first audio sequence 102.

The sub-sequence separator may also determine a second separation point 422b that defines a front portion 426 of the second audio sequence 104 and a back portion 427 of the second audio sequence 104. In such scenarios, a portion of the full audio sequence 10 between the first separation point 422a and the second separation point 422b defines an audio portion to be replaced 428.

Portions of the audio join scenario 420 may be carried out by a gap mask predictor (e.g., gap mask predictor 130) that could be configured to determine a duration of the audio portion to be replaced 428.

Other portions of the audio join scenario 420 may be carried out by an audio representation recovery module (e.g., audio representation recovery module 150), which could be configured to determine a regenerated audio portion 430 and blend the regenerated audio portion 430 with a first extension 432a of the front portion 424 of the first audio sequence 102 and a second extension 432b of the back portion 427 of the second audio sequence 104 to provide blended regenerated audio 436. In some embodiments, the blended regenerated audio 436 is generated from an audio portion comprises a representation of the back portion 425 of the first audio sequence 102, a masked gap 103, and a representation of the front portion 426 of the second audio sequence 104. In various examples, the blended regenerated audio 436 may be fully generated from a trained machine learning model as described herein.

The audio join scenario 420 may also utilize an audio join module (e.g., audio join module 170) that is configured to replace the audio portion to be replaced 428 with the blended regenerated audio 436.

In some example embodiments, the sub-sequence separator could be configured to identify at least one silence interval, wherein the at least one silence interval is characterized by a root-mean-square (RMS) energy $<=0.03$ and an interval duration $>=100$ milliseconds.

In additional examples, the sub-sequence separator could be configured to determine the first separation point or determine the second separation point by determining, using an automatic speech recognition (ASR) method, a transcript of the full audio sequence. In such scenarios, determining the first or second separation point may include performing a text-audio alignment to determine a plurality of word durations of individual words of the transcript or gap intervals between adjacent words. Furthermore, determining the first or second separation point could include determining, based on the word durations or the gap intervals, a plurality of candidate separation points. As an example, the gap intervals could be determined based on a gap between adjacent words being greater than 100 milliseconds.

In some embodiments, at least one of the gap mask predictor or the audio representation recovery module could implement a trained machine learning model. In such scenarios, the trained machine learning model could include a transformer based feature extractor connected with a multilayer perceptron (MLP) layer as described elsewhere herein.

Figure 5:
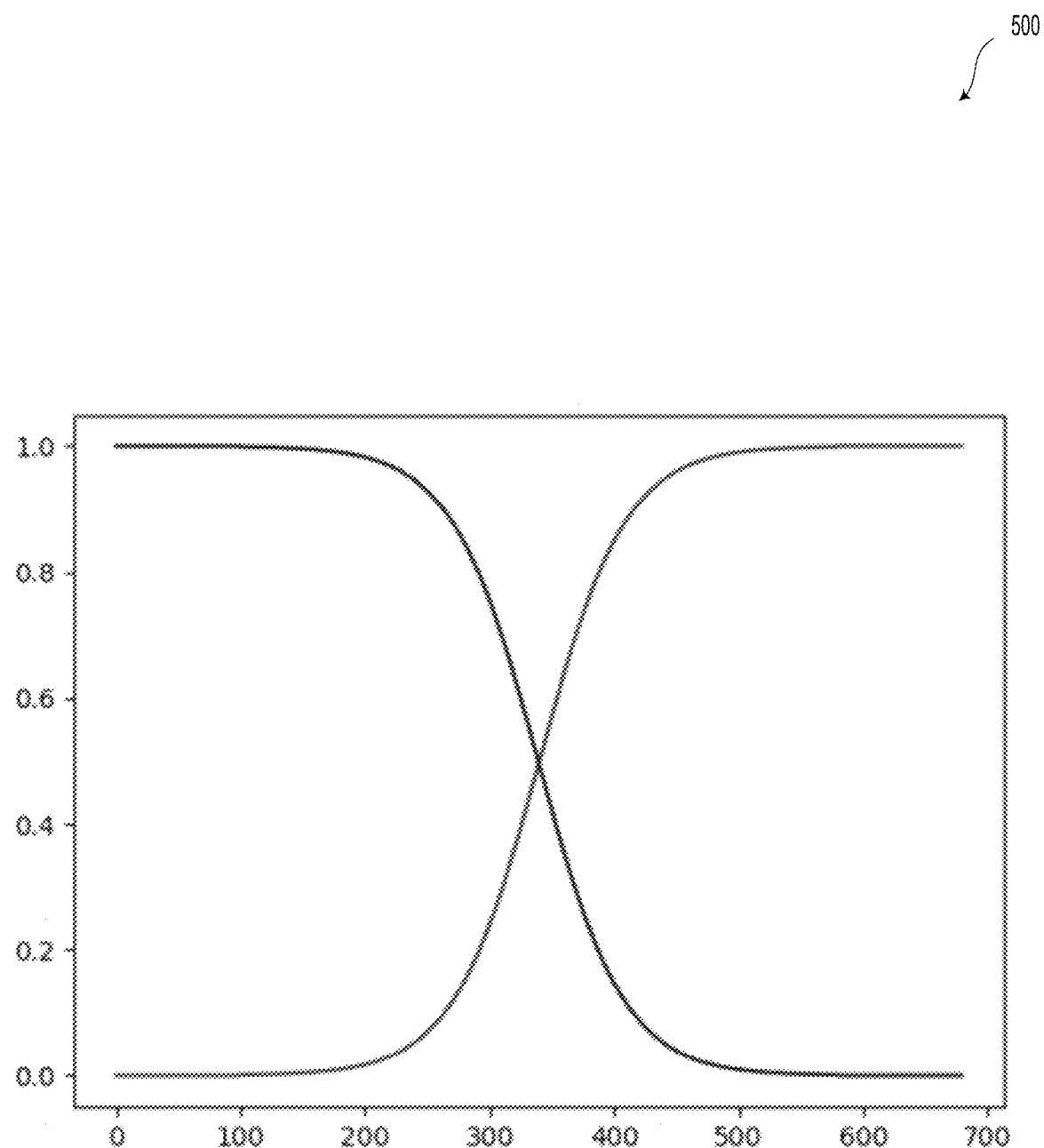
FIG. 5 illustrates a crossfading scenario, according to an example embodiment.

FIG. 5 illustrates a crossfading scenario 500, according to an example embodiment. In the illustrated scenario 500, the volume of a first piece of audio decreases gradually from 1 to 0 while the volume of the second piece of audio increases gradually from 0 to 1, according to a corresponding 1-0 weight curve. The curves of the crossfading scenario 500 correspond to a sigmoid weight curve. In other embodiments, the curves could correspond to a linear descending weight curve, or any other known weight curve used in audio joining methods.

FIG. 6A illustrates an audio join scenario 600 prior to two pieces of audio signal being joined (e.g., first audio signal 602 and second audio signal 604), according to an example embodiment. In the illustrated scenario 600, the two pieces of audio signal are overlaid after the crossfading scenario 500 has been applied. In other embodiments, various crossfading scenarios could be applied.

FIG. 6B illustrates an audio join scenario 610 after two pieces of audio signal have been joined, according to an example embodiment. In the illustrated scenario 610, a zero-crossing join method is applied to remove the portion of the signals from the audio join scenario 600 that cross the 0.00 axis and concatenating the remaining signals to form a final output audio signal.

III. Example Methods

Figure 7:
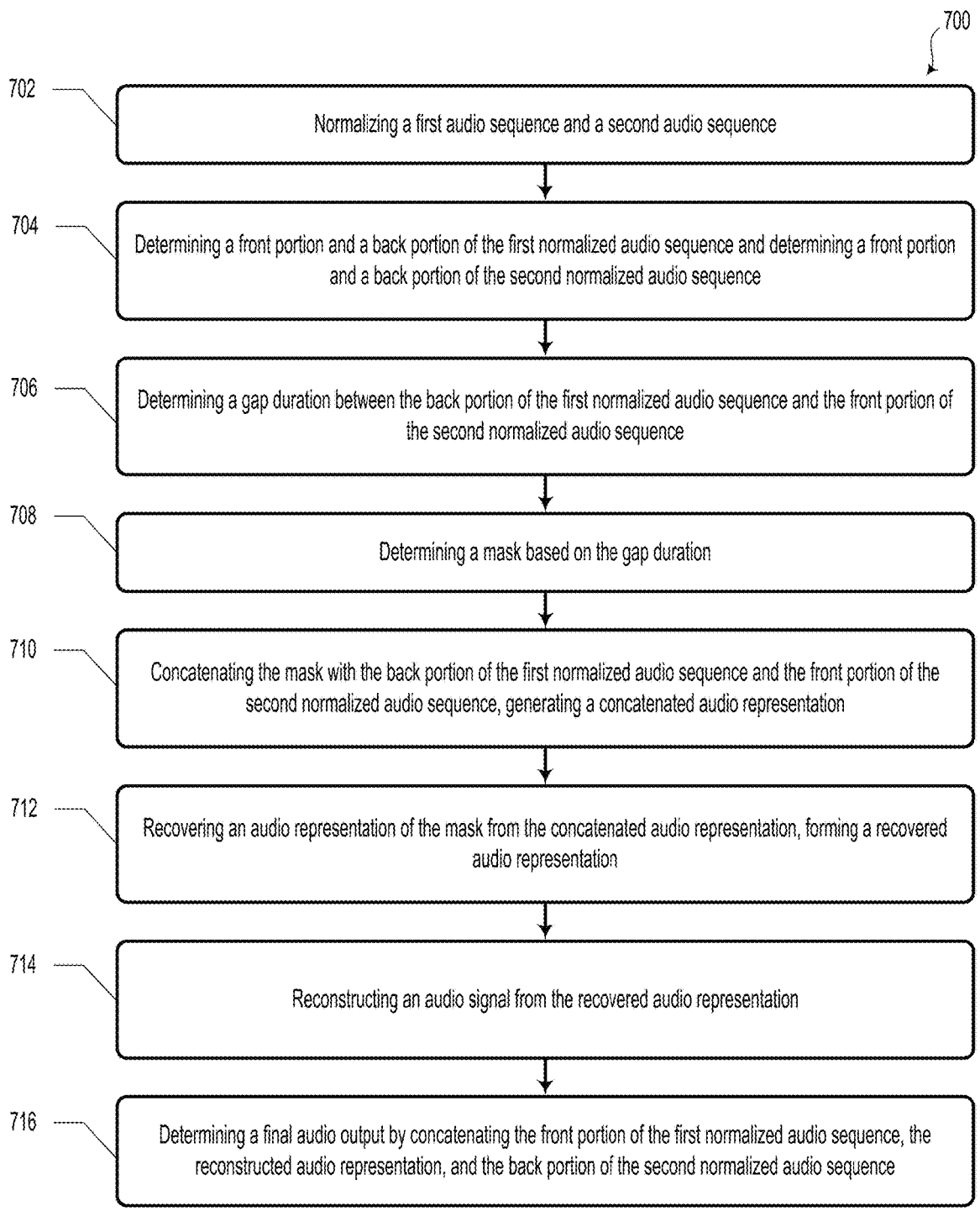
FIG. 7 illustrates a method, according to an example embodiment.

FIG. 7 illustrates a method 700, according to an example embodiment. It will be understood that the method 700 may include fewer or more steps or blocks than those expressly illustrated or otherwise disclosed herein. Furthermore, respective steps or blocks of method 700 may be performed in any order and each step or block may be performed one or more times. In some embodiments, some or all of the blocks or steps of method 700 may be carried out by elements of system 100 as illustrated and described in relation to FIGS. 1-6.

Block 702 includes an optional step of normalizing audio sequences (e.g., first audio sequence 102, second audio sequence 104) by applying a constant amount of gain to the audio sequences based on their respective frequency peaks or volume levels. After normalizing the sequences, block 702 outputs normalized audio sequences (e.g., first normalized audio sequence 112, second normalized audio sequence 114).

Block 704 includes, in response to receiving an audio sequence (e.g., first normalized audio sequence 112, second normalized audio sequence 114), determining a front portion (e.g., front portion 122) and a back portion (e.g., back portion 124) of the audio sequence. Block 704 could include using a sub-sequence separator (e.g., sub-sequence separator 120) to determine the front portions and back portions of the audio sequences.

Block 706 includes determining a gap duration between two audio sequences (e.g., determining a gap duration between back portion 124 of first normalized audio sequence 112 and front portion 126 of second normalized audio sequence 114). Block 706 could include using a gap mask predictor (e.g., gap mask predictor 130) to determine the gap duration.

Block 708 includes further using a gap duration mask predictor (e.g., gap mask predictor 130) to determine a mask (e.g., mask 132) based on the gap duration.

Block 710 includes concatenating a mask (e.g., mask 132) with at least one portion of an audio sequence (e.g., back portion 124 of first normalized audio sequence 112 and front portion 126 of second normalized audio sequence 114), generating a concatenated audio representation (e.g., concatenated audio representation 142). Block 710 could include using an audio-mask feature extraction module (e.g., audio-mask feature extraction module 140).

Block 712 includes recovering an audio representation of a mask (e.g., mask 132) from a concatenated audio representation (e.g., concatenated audio representation 142), forming a recovered audio representation (e.g., recovered audio representation 152).

Block 714 includes receiving an audio representation input (e.g., recovered audio representation 152) and reconstructing (e.g., by using audio vocoder 160) from an audio wave of the audio representation, forming a generated audio sequence (e.g., generated audio sequence 162).

Block 716 includes determining a final audio output (e.g., final audio output 172) by seamlessly concatenating (e.g., audio-join scenario 600) various audio sequences (e.g., front portion 122 of first normalized audio sequence 112, generated audio sequence 162, and back portion 128 of second normalized audio sequence 114).

In some embodiments, method 700 could include normalizing the first audio sequence and the second audio sequence is performed by applying a constant amount of gain to at least one of the first audio sequence or the second audio sequence based on their respective frequency peaks or volume levels.

In various embodiments, method 700 could include determining a front portion and a back portion of the first or the second normalized audio sequence comprises analyzing the respective normalized audio sequence to identify portions of the respective normalized audio sequence during which the amplitude is below a specified amplitude (or loudness) threshold. In various embodiments, method 700 could further include determining points of low sound volume to cut the normalized audio sequences to reduce the talking sounds at the cutting point. Further, method 700 could include finding the first place in an inputted sequence where the energy level is lower than a threshold, as illustrated in FIG. 3. In other embodiments, the method 700 could include running a denoising algorithm to find an appropriate cutting point in the denoised audio. In such an embodiment, if the denoising algorithm could not find an appropriate cutting point, the normalized audio sequences would be output in their entireties.

Additionally, in some embodiments, method 700 could include determining a gap duration between the back portion of the first normalized audio sequence and the front portion of the second normalized audio sequence by: 1) receiving audio data of human speech; 2) selecting a test data entry from the audio data of human speech; 3) removing a randomly selected portion of the test data entry, creating a first audio clip and a second audio clip; 4) estimating the duration of the randomly selected portion based on the first audio clip and the second audio clip; 5) analyzing the difference between the duration of the randomly selected portion and the estimated duration; and 6) updating the gap duration mask predictor based on the analysis.

In further embodiments, method 700 may include generating a mask by: 1) overwriting a segment of the back portion of the first normalized audio sequence with padding having a specified length, generating a first padded segment; 2) overwriting a segment of the front portion of the second normalized audio sequence with padding having a specified length, generating a second padded segment; and 3) concatenating the first padded segment, the mask, and the second padded segment, such that the mask duration is the length of the gap duration combined with the length of the padded segments.

In various embodiments, method 700 may include reconstructing an audio representation comprises applying an artificial neural network configured to receive the concatenated audio representation and determine a corresponding audio representation to replace the mask of the concatenated audio representation.

In various embodiments, method 700 may include an artificially intelligent module which is trained using human speech data categorized by a plurality of features, such as age and gender.

In some embodiments, method 700 could include reconstructing an audio wave from the audio representation is performed by utilizing an artificial neural network configured to generate the audio wave from natural human speech. In some embodiments, this could include a transformer-based machine learning technique such as Audio Bidirectional Encoder Representations from Transformers (Audio BERT).

Further, in some embodiments, method 700 could include concatenating the front portion of the first normalized audio sequence with the reconstructed audio representation and the back portion of the second normalized audio sequence by utilizing a zero-crossing join method, as illustrated in FIGS. 5 and 6. In such embodiments, the zero-crossing join method could include overlapping portions of audio and fading the volume of each portion of audio so as to create a natural transition. The zero-crossing join method could further include multiplying each sample point of audio by a weigh, such that the fading process corresponds to a 1-0 weight curve, which can be either a linear descending curve or a sigmoid curve, in some embodiments, the fade-in curves are inverse to the fade-out curves.

Figure 8:
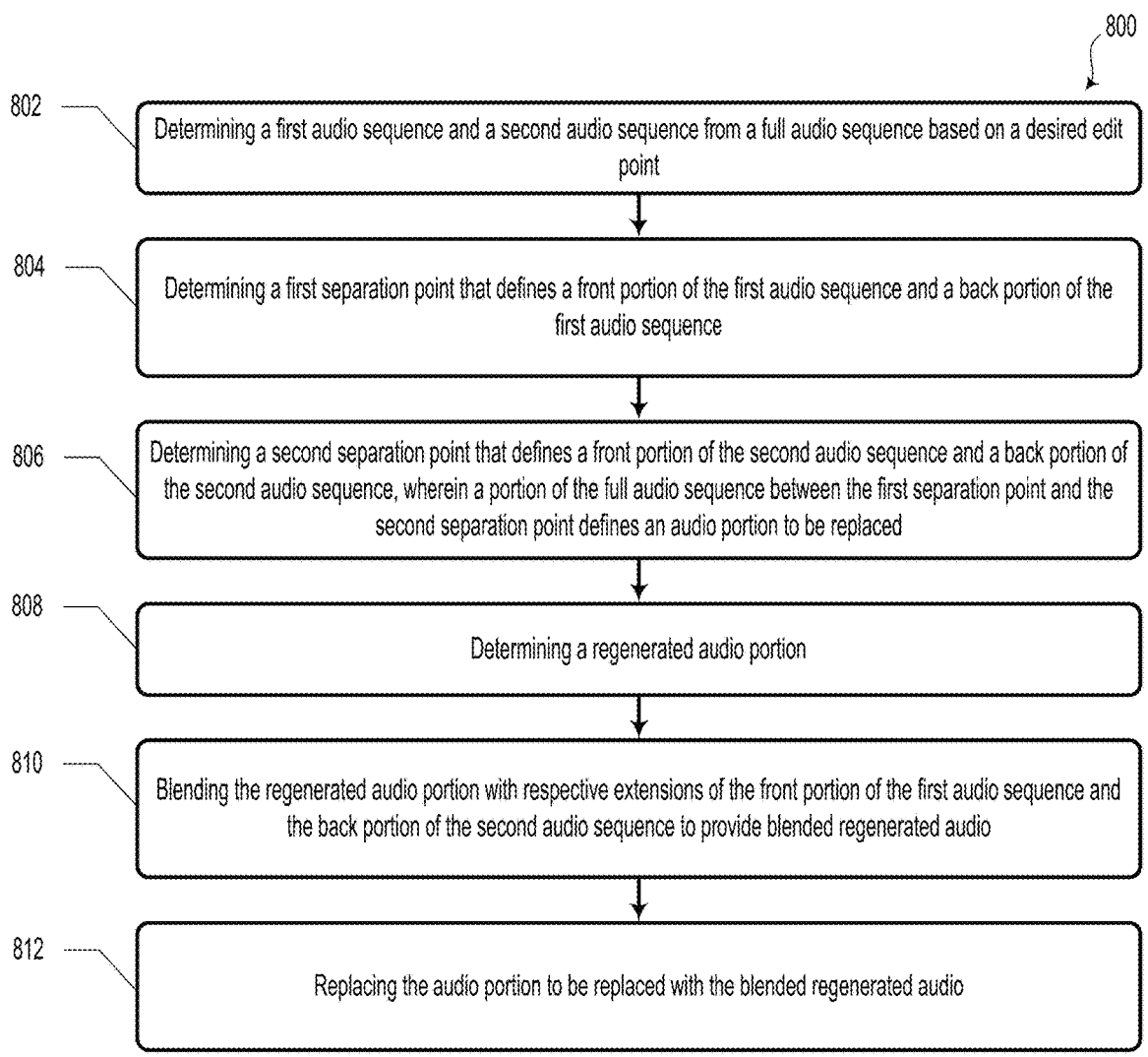
FIG. 8 illustrates a method, according to an example embodiment.

FIG. 8 illustrates a method 800, according to an example embodiment. It will be understood that the method 800 may include fewer or more steps or blocks than those expressly illustrated or otherwise disclosed herein. Furthermore, respective steps or blocks of method 800 may be performed in any order and each step or block may be performed one or more times. In some embodiments, some or all of the blocks or steps of method 800 may be carried out by elements of system 100 as illustrated and described in relation to FIGS. 1-6. In some specific embodiments, method 800 may be similar or identical to that described in relation to FIG. 4B (e.g., audio join scenario 420).

Block 802 includes determining a first audio sequence (e.g., first audio sequence 102) and a second audio sequence (e.g., second audio sequence 104) from a full audio sequence (e.g., full audio sequence 10) based on a desired edit point (e.g., desired edit point 421). In some embodiments, the first audio sequence and the second audio sequence could be joined from a partial audio sequence.

Block 804 includes determining a first separation point (e.g., first separation point 422*a*) that defines a front portion (e.g., front portion 424) of the first audio sequence and a back portion (e.g., back portion 425) of the first audio sequence;

Block 806 includes determining a second separation point (e.g., second separation point 422*b*) that defines a front portion (e.g., front portion 426) of the second audio sequence and a back portion (e.g., back portion 427) of the second audio sequence. In such scenarios, a portion of the full audio sequence between the first separation point and the second separation point defines an audio portion to be replaced (e.g., audio portion to be replaced 428). In some embodiments, determining the first separation point or determining the second separation point could be based on identifying at least one silence interval.

Block 808 includes determining a regenerated audio portion (e.g., regenerated audio portion 430).

Block 810 includes blending the regenerated audio portion with respective extensions of the front portion of the first audio sequence (e.g., first extension 432*a*) and the back portion of the second audio sequence (e.g., second extension 432*b*) to provide blended regenerated audio (e.g., blended regenerated audio 436).

Block 812 includes replacing the audio portion to be replaced with the blended regenerated audio.

In some embodiments, determining the first separation point or determining the second separation point could be based on identifying at least one silence interval. As an example, the at least one silence interval could be characterized by a root-mean-square (RMS) energy $<=0.03$ and an interval duration $>=100$ milliseconds. In such scenarios, identifying at least one silence interval could include identifying a plurality of silence intervals. The respective center points of each silence interval of the plurality of silence intervals could be identified as a respective plurality of candidate separation points.

In various embodiments, determining the first separation point could include selecting a first candidate separation point from the plurality of candidate separation points that occurs immediately prior to the desired edit point. Correspondingly, determining the second separation point could include selecting a second candidate separation point from the plurality of candidate separation points that occurs immediately after to the desired edit point.

In examples, determining the first separation point or determining the second separation point could include determining, using an automatic speech recognition (ASR) method, a transcript of the full audio sequence. In such scenarios, the determination could also include performing a text-audio alignment to determine a plurality of word durations of individual words of the transcript or gap intervals between adjacent words and determining, based on the word durations or the gap intervals, a plurality of candidate separation points.

In various example embodiments, the gap intervals could be determined based on a gap between adjacent words being greater than 100 milliseconds. Other gap durations are possible and contemplated.

Method 800 could include that the extension of the front portion of the first audio portion and/or the extension of the back portion of the second audio sequence is about 50 milliseconds in duration. Other extension durations are contemplated and possible.

In various embodiments, the blended regenerated audio may include a representation of the back portion of the first audio sequence, a masked gap, and a representation of the front portion of the second audio sequence. In such scenarios, the gap duration is inferred by a gap mask predictor (e.g., gap mask predictor 130). As an example, the gap duration may be inferred based on the back portion of the first audio sequence, the gap, and/or the front portion of the second audio sequence. In such scenarios, the gap mask predictor may include a trained machine learning model. The trained machine learning model could include a transformer based feature extractor connected with a multilayer perceptron (MLP) layer.

Additionally examples and embodiments may include training the trained machine learning model according to a training process. For instance, the training process could include performing automatic speech recognition (ASR) on a respective input audio sequence to generate a transcript. Subsequently, the training process may include performing text-audio alignment to identify, for each word in the transcript, a word duration or, for every nearest neighbor pair of words, a gap interval between the two words of each nearest neighbor pair of words. In such scenarios, for consecutive words connected in time, the training process could include randomly choosing a pair of words and deleting a portion of audio of duration between 0-200 milliseconds that is centered at a time where the pair of words are connected to provide an edited audio sequence. Yet further, the training process could include adjusting, by backpropagation, at least one connection weight of the machine learning model based on the edited audio sequence.

In some examples, the duration of the deleted portion of audio could be deterministically weighted so as to more often delete audio portions with duration between 30-80 milliseconds. In some embodiments, the deletion duration follows a Gaussian distribution centered at about 55 ms and a standard deviation of 25 ms. It will be understood that other deletion durations and/or other distributions are possible and contemplated.

In some examples, the block of determining the regenerated audio portion could utilize a trained artificial intelligence model. In such scenarios, method 800 could include training the trained artificial intelligence model according to a training process. The training process could include, for example, performing automatic speech recognition (ASR) on a respective input audio sequence to generate a transcript and performing text-audio alignment to identify, for each word in the transcript, a word duration or, for every nearest neighbor pair of words, a gap interval between the two words of each nearest neighbor pair of words. The training process could also include, for consecutive words connected in time, randomly choosing a pair of words. Yet further, the training process could include deleting a portion of audio of duration between 0-200 milliseconds that is centered at a time where the pair of words are connected to provide an edited audio sequence and adjusting, by backpropagation, at least one connection weight of the artificial intelligence model based on the edited audio sequence. In some embodiments, the audio representation recovery module and the gap mask predictor can be trained differently from one another. For example, the audio representation recovery module may be a trained machine learning model trained to recover an accurate audio representation (e.g., a potentially complex audio waveform) while the gap mask predictor may be a trained machine learning model trained to recover a gap duration (e.g., an amount of time).

In some embodiments, the neural network may predict the duration of the deleted audio portion. In such scenarios, the network training loss is the difference between the true and predicted duration. Additionally or alternatively, the network training loss can be calculated from the edited audio sequence.

In some embodiments, methods and systems described herein may utilize the neural network to predict the audio representation of the masked gap with the gap duration deleted. The network training loss is the difference between a true audio representation and a predicted audio representation.

It will be understood that other types of machine learning models and artificial intelligence models may be trained using other training processes. As an example, other types of training data may be possible and contemplated.

While various examples and embodiments have been disclosed, other examples and embodiments will be apparent to those skilled in the art. The various disclosed examples and embodiments are for purposes of illustration and are not intended to be limiting, with the true scope being indicated by the following claims.

The invention claimed is:

1. A method comprising:
   determining a first audio sequence and a second audio sequence to join based on a desired edit point;
   determining a first separation point that defines a front portion of the first audio sequence and a back portion of the first audio sequence;
   determining a second separation point that defines a front portion of the second audio sequence and a back portion of the second audio sequence, wherein a portion of the full audio sequence between the first separation point and the second separation point defines an audio portion to be replaced, wherein determining the first separation point or determining the second separation point is based on identifying at least one silence interval;
   determining a regenerated audio portion;
   blending the regenerated audio portion with respective extensions of the front portion of the first audio sequence and the back portion of the second audio sequence to provide blended regenerated audio;
   replacing the audio portion to be replaced with the blended regenerated audio.

2. The method of claim 1, wherein the first audio sequence and the second audio sequence are from a full audio sequence.

3. The method of claim 1, wherein the at least one silence interval is characterized by a root-mean-square (RMS) energy <=0.03 and an interval duration>=100 milliseconds.

4. The method of claim 1, wherein identifying at least one silence interval comprises identifying a plurality of silence intervals, wherein respective center points of each silence interval of the plurality of silence intervals are identified as a respective plurality of candidate separation points.

5. The method of claim 4, wherein determining the first separation point comprises selecting a first candidate separation point from the plurality of candidate separation points that occurs immediately prior to the desired edit point, wherein determining the second separation point comprises selecting a second candidate separation point from the plurality of candidate separation points that occurs immediately after to the desired edit point.

6. The method of claim 1, wherein determining the first separation point or determining the second separation point comprises:
   determining, using an automatic speech recognition (ASR) method, a transcript of the full audio sequence;
   performing a text-audio alignment to determine a plurality of word durations of individual words of the transcript or gap intervals between adjacent words; and
   determining, based on the word durations or the gap intervals, a plurality of candidate separation points.

7. The method of claim 6, wherein the gap intervals are determined based on a gap between adjacent words being greater than 100 milliseconds.

8. The method of claim 1, wherein the extension of the front portion of the first audio portion and/or the extension of the back portion of the second audio sequence is about 50 milliseconds in duration.

9. The method of claim 1, wherein the blended regenerated audio comprises a representation of the back portion of the first audio sequence, a masked gap, and a representation of the front portion of the second audio sequence, wherein the gap duration is inferred by a gap mask predictor, wherein the gap mask predictor comprises a trained machine learning model.

10. The method of claim 9, wherein the trained machine learning model comprises a transformer based feature extractor connected with a multilayer perceptron (MLP) layer.

11. The method of claim 9, further comprises training the trained machine learning model according to a training process, the training process comprising:
    performing automatic speech recognition (ASR) on a respective input audio sequence to generate a transcript;
    performing text-audio alignment to identify, for each word in the transcript, a word duration or, for every nearest neighbor pair of words, a gap interval between the two words of each nearest neighbor pair of words;
    for consecutive words connected in time, randomly choosing a pair of words;
    deleting a portion of audio of duration between 0-200 milliseconds that is centered at a time where the pair of words are connected to provide an edited audio sequence; and
    adjusting, by backpropagation, at least one connection weight of the machine learning model based on the edited audio sequence.

12. The method of claim 11, wherein the duration of the deleted portion of audio is weighted so as to more often delete audio portions with duration between 30-80 milliseconds.

13. The method of claim 1, wherein determining the regenerated audio portion utilizes a trained artificial intelligence model.

14. The method of claim 13, further comprising training the trained artificial intelligence model according to a training process, the training process comprising:
    performing automatic speech recognition (ASR) on a respective input audio sequence to generate a transcript;
    performing text-audio alignment to identify, for each word in the transcript, a word duration or, for every nearest neighbor pair of words, a gap interval between the two words of each nearest neighbor pair of words;

for consecutive words connected in time, randomly choosing a pair of words;

deleting a portion of audio of duration between 0-200 milliseconds that is centered at a time where the pair of words are connected to provide an edited audio sequence; and adjusting, by backpropagation, at least one connection weight of the artificial intelligence model based on the edited audio sequence.

* * * * *